J. HANCOCK.
OIL DISPENSING APPARATUS.
APPLICATION FILED AUG. 13, 1915.

1,215,801.

Patented Feb. 13, 1917.
2 SHEETS—SHEET 1.

WITNESSES
E. C. Skinkle
Clara Demarest

INVENTOR
John Hancock
BY HIS ATTORNEYS

J. HANCOCK.
OIL DISPENSING APPARATUS.
APPLICATION FILED AUG. 13, 1915.
1,215,801.
Patented Feb. 13, 1917.
2 SHEETS—SHEET 2.
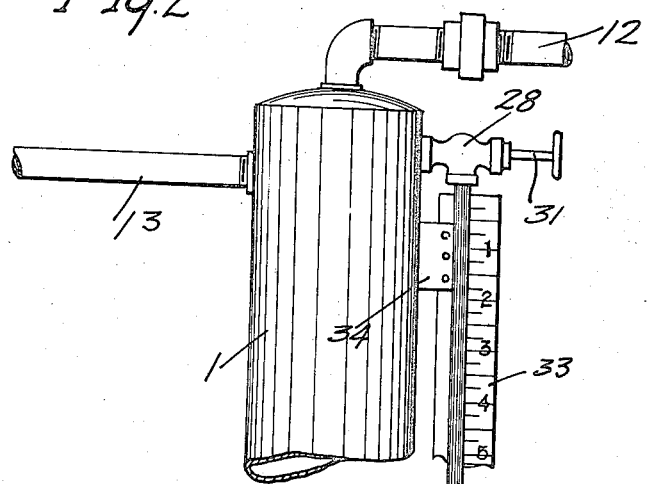
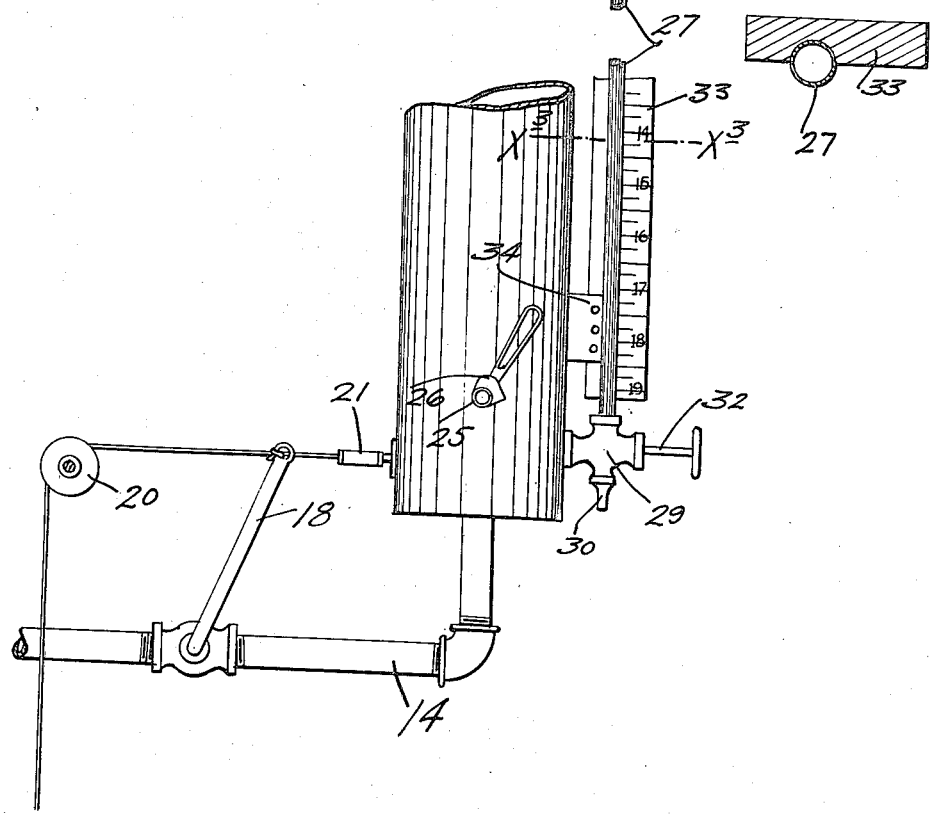
WITNESSES
E. C. Skinkle
Clara Demarest
INVENTOR
John Hancock
BY HIS ATTORNEYS

UNITED STATES PATENT OFFICE.

JOHN HANCOCK, OF MINNEAPOLIS, MINNESOTA.

OIL-DISPENSING APPARATUS.

1,215,801.  Specification of Letters Patent.  Patented Feb. 13, 1917.

Application filed August 13, 1915. Serial No. 45,335.

*To all whom it may concern:*

Be it known that I, JOHN HANCOCK, a citizen of the United States, residing at Minneapolis, in the county of Hennepin and State of Minnesota, have invented certain new and useful Improvements in Oil-Dispensing Apparatus; and I do hereby declare the following to be a full, clear, and exact description of the invention, such as will enable others skilled in the art to which it appertains to make and use the same.

My invention has for its object to provide an improved liquid vending apparatus especially adapted for use at so-called oil filling stations where gasolene is dispensed to the automobile trade.

Generally stated, the invention consists of the novel devices and combinations of devices hereinafter described and defined in the claims.

In the accompanying drawings which illustrate the invention, like characters indicate like parts throughout the several views.

Referring to the drawings:

Fig. 2 is a view in elevation with some parts broken away, showing the dispensing tank and certain of the connections thereto, which are located above the ground; and Fig. 3 is a horizontal section on the line $x^3$ $x^3$ of Fig. 2, showing the sight tube and graduated indicator scale which is associated therewith.

Figure 1:
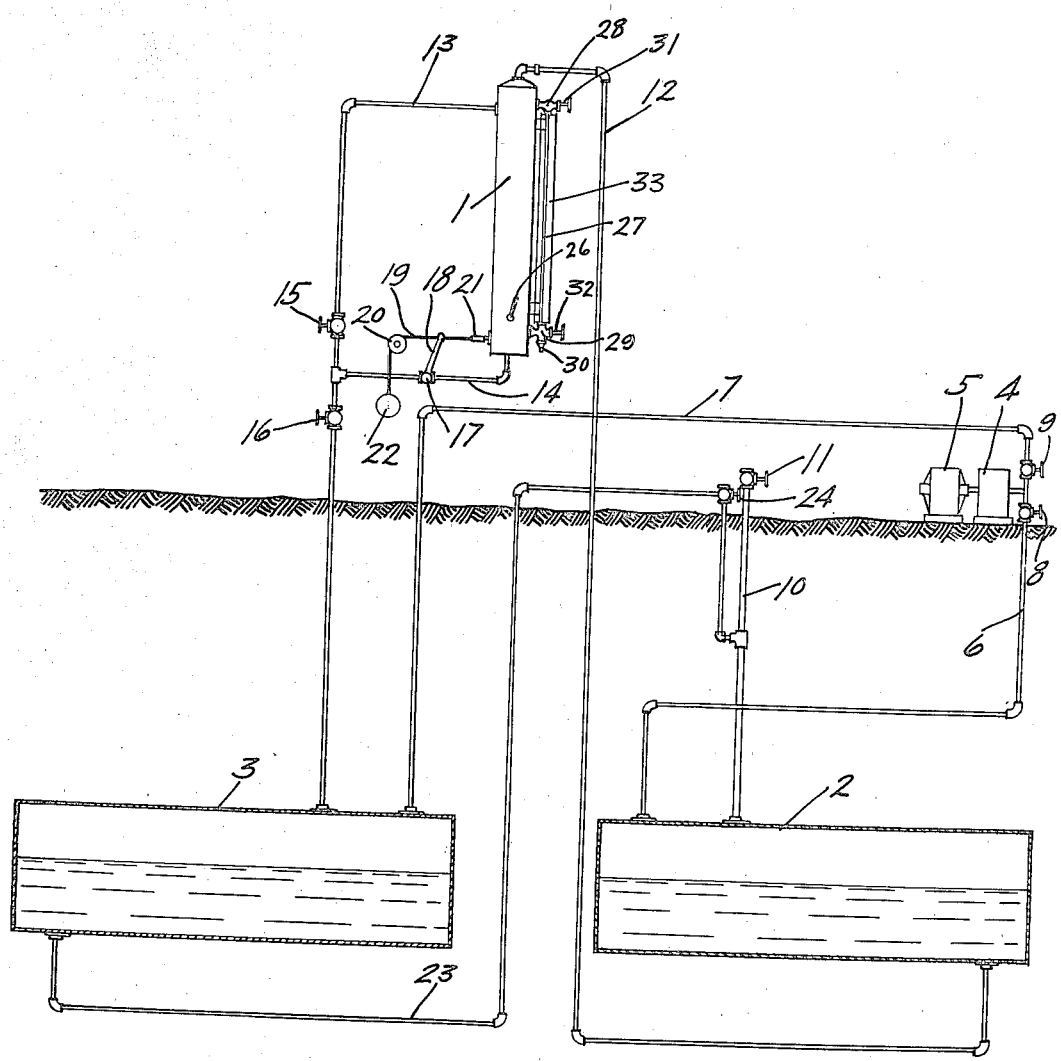
Figure 1 is a plan view showing partly in plan and partly in section, the parts of the vending plant so far as they relate to this application.

The numeral 1 indicates an upright dispensing tank which is located at a suitable elevation above the ground. The numeral 2 indicates a supply tank and the numeral 3 an overflow tank, both of which are located below the ground. The numeral 4 indicates an air compressor shown as driven from an electric motor 5, or other suitable source of power. The said compressor and motor should, of course, be located above the ground where easy access is had thereto, and when this dispensing apparatus is installed at the filling station, they will be closely associated with the dispensing tank, and preferably located within a small house or office building.

The compressor 4 is connected to the top of the supply tank 2 by an air pipe 6, and is connected to the top of the overflow tank 3 by an air pipe 7. The pipes 6 and 7 are provided, respectively, with valves 8 and 9. The numeral 10 indicates a filling tube which leads from a point above the ground to the upper portion of the supply tank 2, and it is provided above the ground with a valve 11. The bottom of the supply tank 2 is connected to the top of the dispensing tank 1, by an oil pipe 12. One side of the dispensing tank 1, a short distance from its upper end, is connected to the upper end of an overflow pipe 13 that is extended downward and connected to the top of the overflow tank 3. The numeral 14 indicates a drain pipe which leads from the extreme bottom of the dispensing tank 1 and connects to the intermediate portion of the overflow pipe 13. The said overflow pipe 13 is provided with valves 15 and 16, located, respectively, above and below the drain pipe 14. The drain pipe 14 is provided with a normally closed valve 17, the arm 18 of which is connected to a cable 19 that runs over a suitably supported guide sheave 20. One end of this cable 19 is anchored to the tank 1, or other suitable fixed object, by a fuse 21 of a metal or other material that is capable of being quickly fused in case of fire, or by abnormal heat.

The depending end of the cable 19 is provided with a weight 22 which, when the fuse 21 is severed, automatically moves the valve 17 into an open position and permits the dispensing tank to be automatically drained into the overflow tank 3. The valves 15 and 16 are normally open.

The numeral 23 indicates an oil transfer pipe that extends from the bottom of the overflow tank 3 to the upper portion of the supply tank 2, and which, as shown, taps the pipe 10 at its intermediate portion. This pipe 23 is provided with a normally closed valve 24.

The dispensing tank 1 is provided with a dispensing tube 25 leading from one side of the tank, preferably at a point considerably above the bottom thereof. This dispensing tube 25 is normally closed by a valve 26. The dispensing tube 25, in practice, will be provided with a hose or flexible extension not shown.

The numeral 27 indicates a long upright closed sight tube, the upper end of which is connected to the upper portion of the dispensing tank 1, by means of a T-shaped valve casing 28, and the lower end of said tube is connected to the lower portion of said dispensing tank by a cylinder valve casing 29 which latter, however, is shown as provided with a depending drain nipple 30 having a normally closed valve. The passages through the valve casings 28 and 29, from the dispensing tank to the sight tube, are normally opened, but they are adapted to be closed when desired, respectively, by suitable needle valves 31 and 32. Here it is important to note that the upper valve casing 29 is located above the upper end of the overflow pipe 13, while the lower valve casing 29 is located below the dispensing tube 25.

Associated with the sight tube is a graduated scale indicating, preferably in gallons and fractions thereof, the amount of oil or liquid contents of the dispensing tank. The graduated scale 33 may be conveniently marked upon a board, and this board may be rigidly secured to the dispensing tank, by suitable brackets 34, so that it occupies a permanent position in respect to the tank and sight tube. Here it is important to note that the extreme upper end or zero mark of the said scale is in a horizontal line with the overflow passage leading from the upper portion of the dispensing tank to the upper end of the overflow tube 13 (note dotted line in Fig. 2). Also, it is important to note that the extreme lower end of said scale, or in other words, the graduation mark thereof that indicates the greatest possible amount that may be drawn from the dispensing tank at any one time, is in horizontal line with the dispensing tube 25.

The oil will be forced from the supply tank 2 into the dispensing tank when valves 9, 11 and 24 are closed, valve 8 opened and the compressor 4 is then caused to force air into the upper portion of the said supply tank. No great care need be taken to stop the flow of oil just the instant that the dispensing tank 1 is filled up to the zero mark on the scale, because any surplus oil will simply flow out of the dispensing tank through the overflow pipe 13 and into the overflow tank 3. The flow of oil from the tank 2 into the dispensing tank 1 may be quickly stopped, simply by opening the valve 11 so as to permit the air, under pressure, to escape from the supply tank. Here it may be noted that the oil in the sight tube 17 will stand at the zero mark on the scale when the dispensing tank is filled to its maximum, thereby indicating that no oil has yet been drawn from the filled tank.

When oil is drawn off through the dispensing tube 25, it will of course, be lowered in the dispensing tank, and the extent to which it is lowered will be shown in the sight tube, and the scale will indicate the amount of oil drawn from the dispensing tank in one operation, or any number of successive operations which occur between the times that the said dispensing tank has been filled.

In this way, it is a very easy matter to accurately determine the amount of oil that is dispensed, or sold.

To cause the oil caught in the overflow tank 3 to be transferred back into the supply tank 2, first close valves 8, 11 and 16, and open valve 24, and then throw compressor 4 into action, so as to deliver air, under pressure, through pipe 7 into the top of the said tank 3.

The point where the overflow pipe 13 taps the tank 1 may be treated as the overflow port, while the point where the service tube 25 taps said tank may be treated as the service port. The overflow port determines the altitude to which the tank can be filled and the service port determines the point down to which the said tank may be drained. The graduated scale indicates the amount of liquid contained in the said tank between said overflow and service ports. The sight tube should extend from a point at least as high up as the said overflow port and down to a point at least as low as the said service port, so that the altitude of the liquid in the tank can be observed at all points between its highest and lowest points above noted.

What I claim is:

1. The combination with a dispensing tank having an overflow port at its upper portion and a service port at its lower portion, of means for controlling the discharge through the service port, and a sight tube associated with said tank to disclose the successive liquid levels in the tank from the overflow port to the service port.

2. The combination with a dispensing tank having an overflow port at its upper portion and a service port at its lower portion, of means for controlling the discharge through the service port, a sight tube associated with said tank to disclose the successive liquid levels in the tank from the overflow port to the service port, and a graduated scale associated with the tube to indicate the amount of liquid between said ports.

3. The combination with a dispensing tank having an overflow port at its upper portion and a service port at the lower portion, of means for controlling the discharge through said service port, means for supplying the liquid to said tank, a sight tube connected to said tank and extended from a point at least as high as said overflow port to a point at least as low as said service port, a scale associated with said sight tube and graduated to indicate the amount of liquid contained in said tank between the overflow and said service ports, an overflow tank receiving from said overflow port, and means for delivering the contents of said overflow tank back into said dispensing tank at will.

4. The combination with a dispensing tank, of a supply pipe for delivering to the top thereof, an overflow pipe leading from said tank at a point near to but below the top thereof, a dispensing tube leading from said tank at a point near to the bottom thereof, a sight tube having its lower end connected to the lower portion of said tank and having its upper end connected to the upper portion of said tank at a point above said overflow pipe, a scale associated with said sight tube and having its zero mark horizontally alined with said overflow pipe, a supply tank located below said dispensing tank and from which said supply tube is extended, an overflow tank located below said dispensing tank and to which said overflow pipe is connected, a valve-equipped pipe connecting the lower portion of said overflow tank to said supply tank, and means for producing air pressure into said supply tank and overflow tank, at will.

5. The combination with a dispensing tank, of a supply pipe for delivering to the top thereof, an overflow pipe leading from said tank at a point near to but below the top thereof, a dispensing tube leading from said tank at a point near to the bottom thereof, a sight tube having its lower end connected to the lower portion of said tank and having its upper end connected to the upper portion of said tank at a point above said overflow pipe, a scale associated with said sight tube and having its zero mark horizontally alined with said overflow pipe, a drain pipe connecting the bottom of said dispensing tank to said overflow pipe, a valve in said drain pipe, and a device under strain to open said valve but having a fuse normally holding said valve closed.

In testimony whereof I affix my signature in presence of two witnesses.

JOHN HANCOCK.

Witnesses:
   CLARA DEMAREST,
   B. G. WHEELER.